(12) United States Patent
Richter et al.

(10) Patent No.: US 11,566,896 B2
(45) Date of Patent: Jan. 31, 2023

(54) SURVEYING SYSTEM WITH IMAGE-BASED MEASURING

(71) Applicant: LEICA GEOSYSTEMS AG, Heerbrugg (CH)

(72) Inventors: Bernhard Richter, Hard (AT); Zoltán Török, Berneck (CH); Elmar Vincent Van Der Zwan, Walzenhausen (CH); Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 529 days.

(21) Appl. No.: 16/548,688

(22) Filed: Aug. 22, 2019

(65) Prior Publication Data

US 2021/0055102 A1   Feb. 25, 2021

(51) Int. Cl.
| | |
|---|---|
| *G01C 15/00* | (2006.01) |
| *G01C 11/04* | (2006.01) |
| *G01C 1/04* | (2006.01) |
| *G01C 11/02* | (2006.01) |
| *G01S 19/13* | (2010.01) |

(52) U.S. Cl.
CPC .............. *G01C 15/002* (2013.01); *G01C 1/04* (2013.01); *G01C 11/02* (2013.01); *G01C 11/04* (2013.01); *G01S 19/13* (2013.01)

(58) Field of Classification Search
CPC ........ G01C 15/002; G01C 1/04; G01C 11/02; G01C 11/04; G01S 19/13
See application file for complete search history.

(56) References Cited

U.S. PATENT DOCUMENTS

| | | | |
|---|---|---|---|
| 2011/0064312 A1 | 3/2011 | Janky et al. | |
| 2011/0157359 A1 | 6/2011 | Sharp | |
| 2017/0067739 A1* | 3/2017 | Siercks | ................ H04N 5/2257 |
| 2018/0365891 A1* | 12/2018 | Kuang | ...................... G06T 7/80 |

FOREIGN PATENT DOCUMENTS

| | | |
|---|---|---|
| WO | 2010080950 A1 | 7/2010 |
| WO | 2011163454 A1 | 12/2011 |

\* cited by examiner

*Primary Examiner* — Luke D Ratcliffe
(74) *Attorney, Agent, or Firm* — Maschoff Brennan

(57) ABSTRACT

A method for image-based point measurement includes moving a surveying system along a path through a surrounding and capturing a series of images of the surrounding. A subset of images are defined as frames and a subset of frames are defined as key-frames. Textures are identified in first and second frames and are tracked in successive frames to generate first and second frame feature lists. A structure from motion algorithm is used to calculate camera poses for the images based on the first and second frame feature lists. Corresponding image points in images of the series of images are identified using feature recognition in at least a plurality of images. Three-dimensional coordinates of the selected image point are determined using forward intersection with the poses of the subset of images in which corresponding image points are identified. The three-dimensional coordinates of the selected image point are presented to the user.

26 Claims, 8 Drawing Sheets

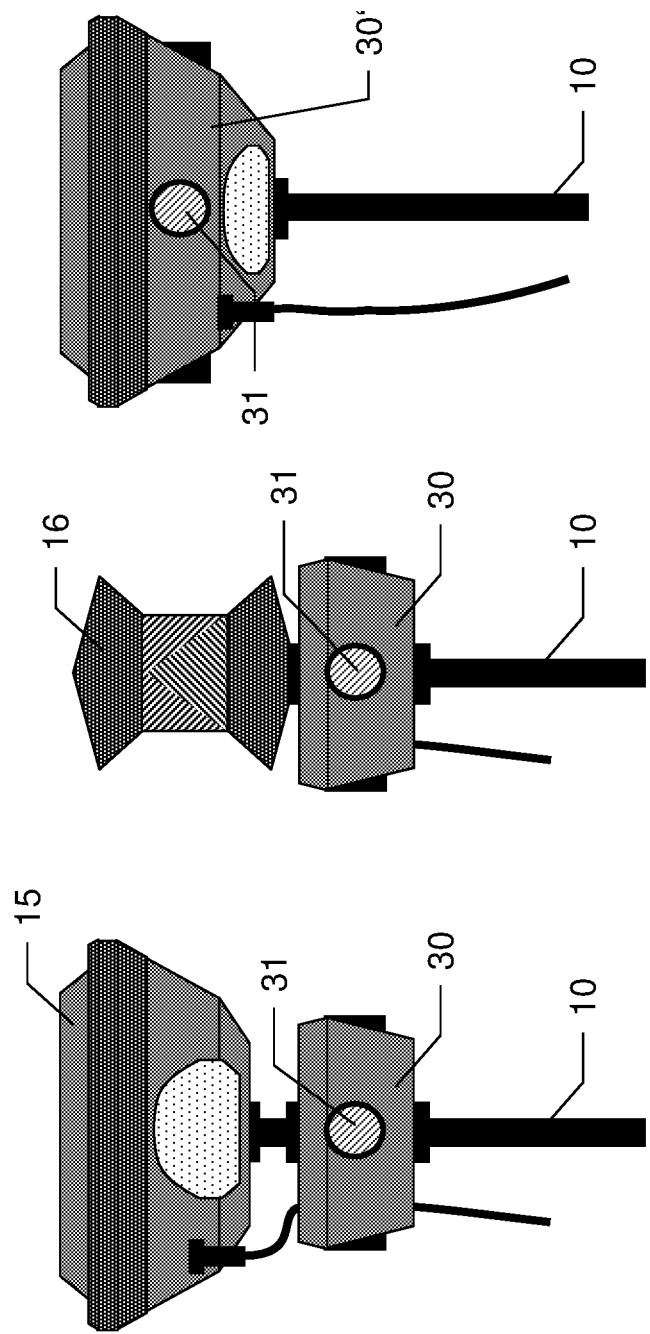

Figure 1:
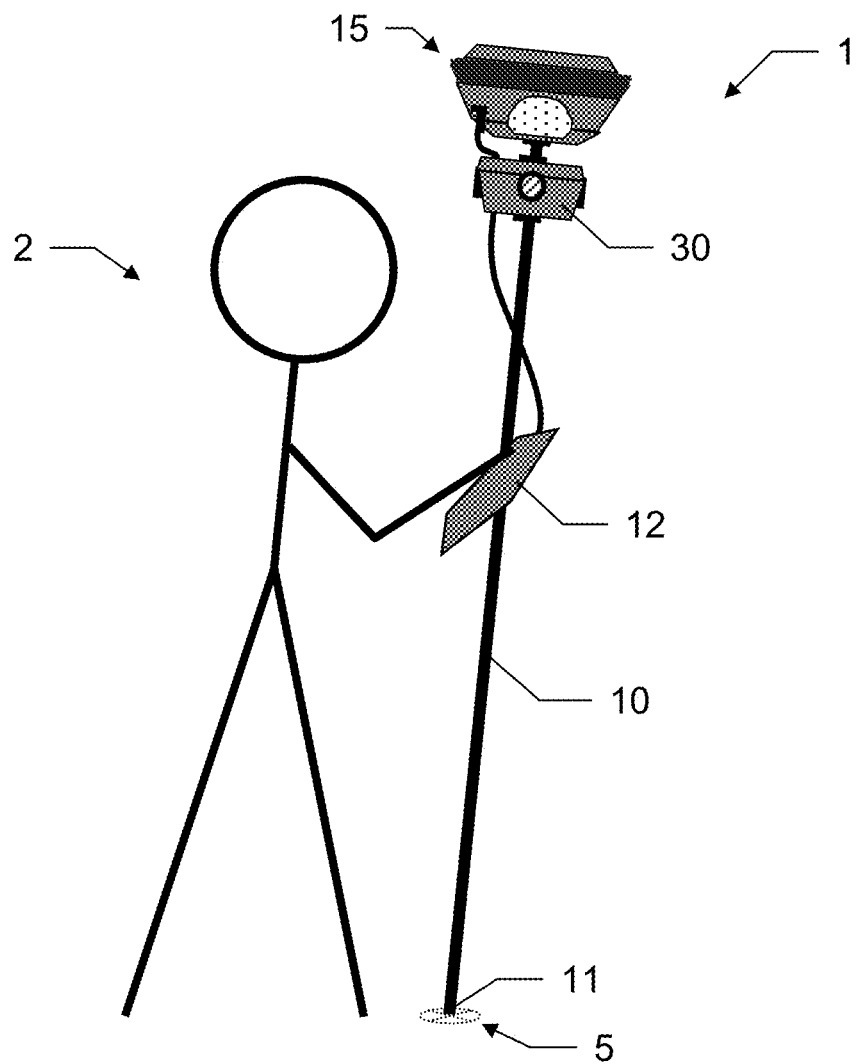

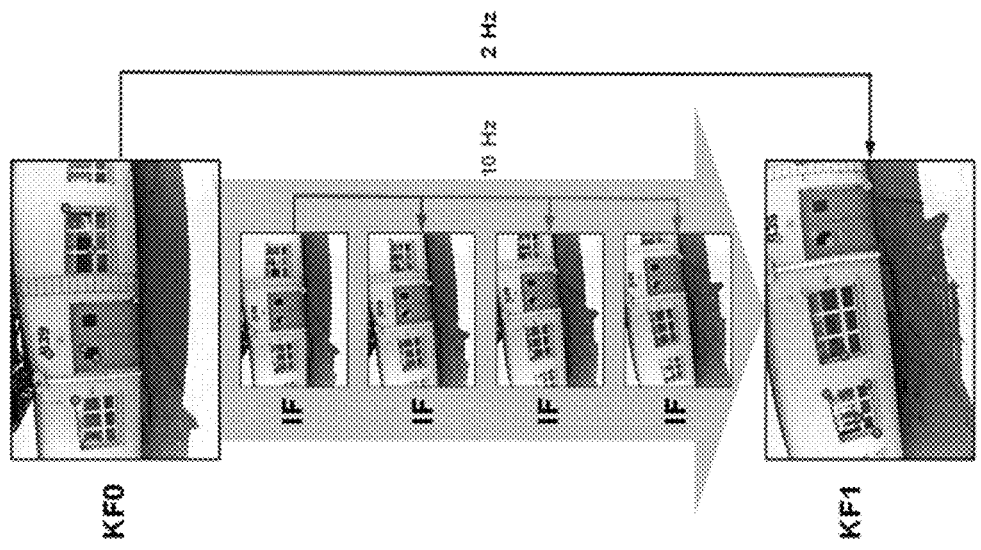
Fig. 4b
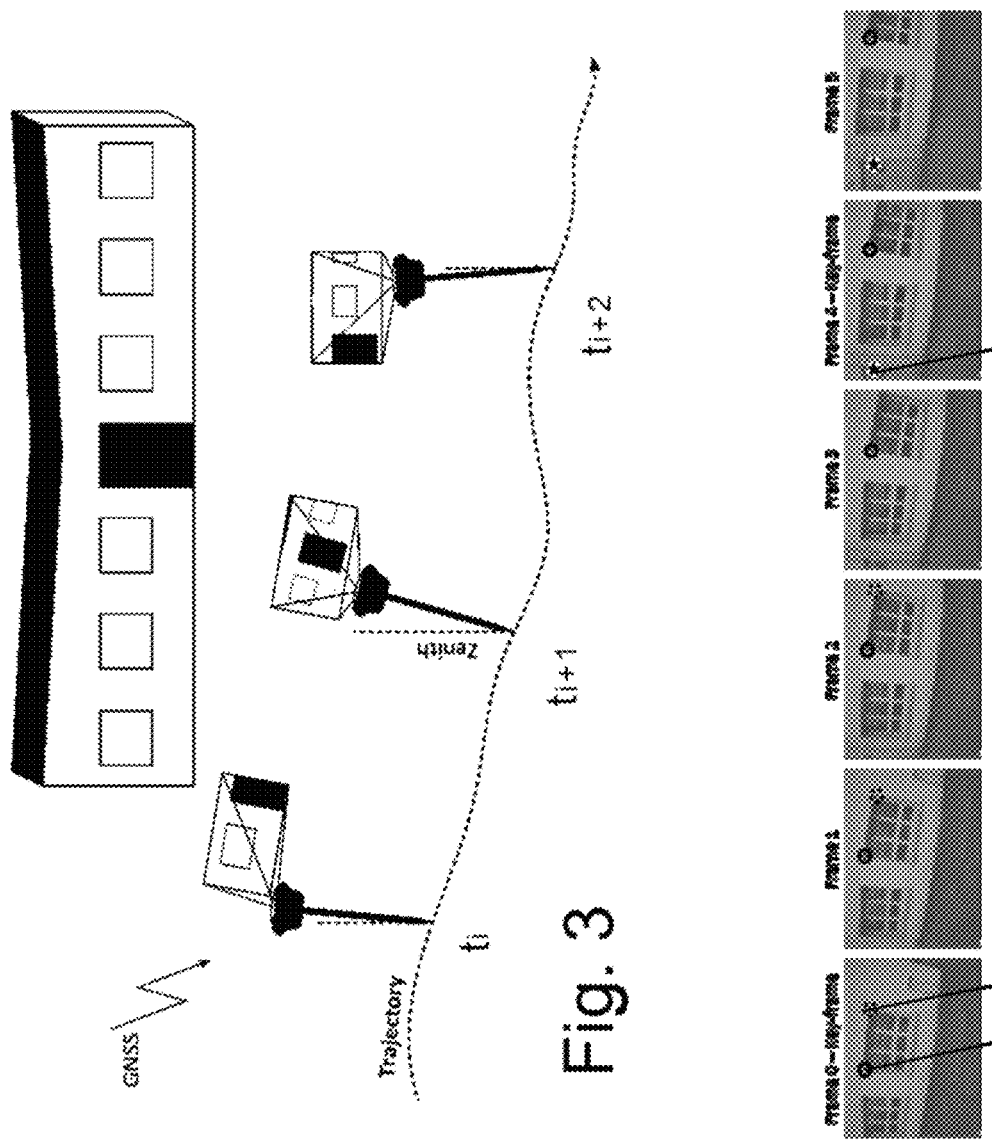
Fig. 3
Fig. 4a

SURVEYING SYSTEM WITH IMAGE-BASED MEASURING

The present invention pertains to a surveying system with a camera module that can be attached on a pole to a GNSS (global navigation satellite system) antenna or a reflector for capturing a series of images of a surrounding. The surveying system is configured to perform an image point measurement functionality wherein—after the series of images has been captured—a user is enabled to select an image point of an image of the series to have coordinates of that feature in the surrounding be automatically determined that is represented by the selected image point. Determining the coordinates comprises defining a subset of images, using an SfM (Structure from Motion) algorithm and using feature recognition in a plurality of images of the series.

US 2011/0064312 A1 relates to image-based geo-referencing and discloses a combination of GNSS measurements with image processing to provide new solutions for positioning. Stored geo-referenced images are compared (feature-correlated) with actual images made by a GNSS receiver. This is then used to qualify the accuracy of the GNSS measurement or complement missing parts (e.g. height information). It is also possible the other way round, i.e. the GNSS measurement is used to update the geo-reference of the stored images. This can also be used to determine a local coordinate system.

US 2011/0157359 A1 discloses aligning a virtual perspective centre of a camera with the measurement (antenna) centre of a position measurement system. This facilitates computations in a combined image/GNSS system. WO 2011/163454 A1 discloses a method and apparatus for image-based positioning, tracking image features from one image to the next in order to determine the position change of a GNSS receiver using SLAM techniques. WO 2010/080950 A1 discloses determining orientation of a GNSS receiver from image data.

A processing of data recorded by a system with cameras requires high computational resources. The state-of-the-art solution is known as processing of data on a powerful computer or on an external cloud server. The processing time might be quite time consuming and usually is performed in the office.

It is an object of the present invention to provide an improved system and an improved method that allow image-based point measurement.

It is another object to provide such a system and method that reduces the required amount of data to be transferred.

At least one of these objects is achieved by the implementation of the characterizing features of the independent claims. Advantageous embodiments of the invention are found in this case in the respective dependent claims.

A first aspect of the invention relates to a surveying system that is configured to determine positions of a position measuring resource that is mounted on a surveying pole in a coordinate system of the surveying system. For instance, the position measuring resource is a Global Navigation Satellite System (GNSS) antenna or a retro-reflector. The surveying system comprises a surveying subsystem with a camera module and a control and evaluation unit, wherein the camera module is attached to the surveying pole and comprises at least one camera for capturing images and the control and evaluation unit is configured to control and execute an image point measurement functionality in which a series of images of a surrounding is captured with the at least one camera while the surveying system is moved along a path through the surrounding, the series comprising a multitude of images captured with different camera poses representing respective positions and orientations of the camera, camera poses for the images of the series are estimated, and the series of images is stored and presented to a user.

According to some embodiments of this surveying system, for estimating the camera poses the control and evaluation unit is configured to define at least a subset of images as frames and to define a subset of frames as key-frames, to identify in a first frame a plurality of textures as first features, to track the first features in frames succeeding the first frame, and to generate a first frame feature list for the first frame, wherein the first frame feature list at least comprises a position determined by the position measuring resource for the first frame, and a feature ID, image coordinates and—optionally—eigenvalues of at least one first feature, to identify in a second frame a plurality of textures as second features, to track the second features in frames succeeding the second frame, and to generate a second frame feature list for the second frame, wherein the second key-frame feature list at least comprises a position determined by the position measuring resource for the second frame, and a feature ID, image coordinates and—optionally—eigenvalues of at least one second feature, and to use a structure-from-motion algorithm to calculate camera poses based at least on the first and second frame feature lists. Upon a selection, by the user, of a key-frame and of an image point in the selected key-frame, the image point measurement functionality of the control and evaluation unit further comprises determining three-dimensional coordinates of the selected image point and presenting the three-dimensional coordinates to the user. Determining the three-dimensional coordinates comprises identifying corresponding image points in at least a subset of images of the series of images, wherein the corresponding image points relate to the same feature in the surrounding as the selected image point, and identifying the corresponding image points comprises using feature recognition in at least a plurality of images of the series of images, and using forward intersection with the poses of the subset of images in which corresponding image points are identified.

According to one embodiment of the surveying subsystem, the first frame is a first key-frame and the first frame feature list is a first key-frame feature list. In particular, also the second frame is a second key-frame and the second frame feature list is a second key-frame feature list.

According to one embodiment, the surveying subsystem, particularly its camera module, comprises an inertial measurement unit comprising a three-axis accelerometer, a three-axis gyroscope and/or a magnetometer, wherein the key-frame feature lists comprise data from the inertial measurement unit for the respective key-frame.

According to another embodiment of the surveying subsystem, using feature recognition comprises searching for a feature along an epipolar line in the plurality of images.

According to another embodiment of the surveying subsystem, frames are defined as a subset of images that are captured with a rate of 5 to 20 Hz, particularly with a rate of about 10 Hz.

According to another embodiment of the surveying subsystem, every image is defined as a frame, wherein the images are captured with a consistent rate of 5 to 20 Hz, particularly with a rate of about 10 Hz.

According to another embodiment of the surveying subsystem, key-frames are defined as a subset of images that are captured with a rate of 1 to 4 Hz, for instance with a rate of about 2 Hz.

According to another embodiment of the surveying subsystem, every third to tenth frame is defined as a key-frame, for instance every fifth frame.

According to another embodiment of the surveying subsystem, the camera poses of the key-frames are presented to the user, e. g. by means of a symbol in a two-dimensional map of the surrounding, the symbol being positioned and oriented according to the camera pose, and a key-frame is selectable by the user by selection of a camera pose.

According to another embodiment of the surveying subsystem, the structure from motion algorithm is configured to calculate camera poses based at least on the first and second key-frame feature lists and further based on camera parameters, position measuring resource parameters, position measuring resource positions and Inertial Navigation System data.

According to another embodiment of the surveying subsystem, the camera parameters comprise a camera image size, a pixel size, a camera constant, a principal point, radial and tangential distortion parameters and extrinsic parameters, the position measuring resource parameters comprise a camera offset with respect to the position measuring resource, the position measuring resource positions comprise a timestamp, coordinates, status and accuracy information, and the Inertial Navigation System data comprises a timestamp, an Inertial Navigation System pose, and accuracy information. The Inertial Navigation System pose, e. g., comprises three rotation angles or a rotation matrix determined by an inertial measurement unit of the camera module.

A second aspect of the invention pertains to a method for image-based point measurement. The method comprises moving a surveying system along a path through a surrounding, particularly a surveying system of one of the preceding claims;

capturing a series of images of the surrounding with at least one camera while moving along the path, the series comprising a multitude of images captured with different camera poses representing respective positions and orientations of the camera;

defining at least a subset of images as frames and defining a subset of frames as key-frames;

identifying in a first frame a plurality of textures as first features, tracking the first features in frames succeeding the first frame, and generating a first frame feature list for the first frame, wherein the first frame feature list at least comprises a position determined by the position measuring resource for the first frame, and a feature ID, image coordinates and—optionally—eigenvalues of at least one first feature;

identifying in a second frame a plurality of textures as second features, tracking the second features in frames succeeding the second frame, and generating a second frame feature list for the second frame, wherein the second frame feature list at least comprises a position determined by the position measuring resource for the second frame, and a feature ID, image coordinates and—optionally—eigenvalues of at least one second feature;

using a structure from motion algorithm to calculate camera poses for the images of the series based at least on the first and second key-frame feature lists;

storing and presenting at least the key-frames of the series of images to a user for selection of a key-frame and of an image point in the selected key-frame to be measured;

identifying corresponding image points in at least a subset of images of the series of images, wherein the corresponding image points relate to the same feature in the surrounding as the selected image point, and identifying the corresponding image points comprises using feature recognition in at least a plurality of images of the series of images;

determining three-dimensional coordinates of the selected image point using forward intersection with the poses of the subset of images in which corresponding image points are identified; and presenting the three-dimensional coordinates of the selected image point to the user.

According to one embodiment of the method, the first frame is a first key-frame and the first frame feature list is a first key-frame feature list. In particular, also the second frame is a second key-frame and the second frame feature list is a second key-frame feature list.

According to one embodiment of the method, the key-frame feature lists comprise data from an inertial measurement unit for the respective key-frame.

According to another embodiment of the method, using feature recognition comprises searching for a feature along an epipolar line in the plurality of images.

According to another embodiment of the method, frames are defined as a subset of images that are captured with a rate of 5 to 20 Hz, for instance with a rate of about 10 Hz.

According to another embodiment of the method, every image is defined as a frame, wherein the images are captured with a consistent rate of 5 to 20 Hz, for instance with a rate of about 10 Hz.

According to another embodiment of the method, key-frames are defined as a subset of images that are captured with a rate of 1 to 4 Hz, for instance with a rate of about 2 Hz.

According to another embodiment of the method, every third to tenth frame is defined as a key-frame, for instance every fifth frame.

According to another embodiment of the method, presenting the camera poses of the key-frames to the user, e. g. by displaying a symbol in a two-dimensional map of the surrounding, the symbol being positioned and oriented according to the camera pose, wherein a key-frame is selectable by the user by selection of a camera pose.

According to another embodiment of the method, the calculated camera poses are calculated based at least on the first and second key-frame feature lists and further based on camera parameters, position measuring resource parameters, position measuring resource positions and Inertial Navigation System data.

According to another embodiment of the method, the camera parameters, comprise a camera image size, a pixel size, a camera constant, a principal point, radial and tangential distortion parameters and extrinsic parameters, the position measuring resource parameters comprise a camera offset with respect to a position measuring resource of the surveying system, the position measuring resource positions comprise a timestamp, coordinates, status and accuracy information, and the Inertial Navigation System data comprises a timestamp, an Inertial Navigation System pose, and accuracy information. The Inertial Navigation System pose, e. g., comprises three rotation angles or a rotation matrix determined by an inertial measurement unit of the surveying system.

A third aspect of the invention pertains to a computer program product having program code which is stored on a machine-readable carrier, in particular on a control and evaluation unit of the surveying system according to the first aspect of the invention, for executing at least the following steps of the method according to the second aspect of the invention:

- defining at least a subset of images as frames and defining a subset of frames as key-frames;
- identifying in a first key-frame a plurality of textures as first features, tracking the first features in frames succeeding the first key-frame, and generating a first key-frame feature list for the first key-frame, wherein the first key-frame feature list at least comprises a position determined by the position measuring resource for the first key-frame, and a feature ID, image coordinates and eigenvalues of at least one first feature;
- identifying in a second key-frame a plurality of textures as second features, tracking the second features in frames succeeding the second key-frame, and generating a second key-frame feature list for the second key-frame, wherein the second key-frame feature list at least comprises a position determined by the position measuring resource for the second key-frame, and a feature ID, image coordinates and eigenvalues of at least one second feature;
- using a structure from motion algorithm to calculate camera poses for the images of the series based at least on the first and second key-frame feature lists;
- storing and presenting at least the key-frames of the series of images to a user for selection of a key-frame and of an image point in the selected key-frame to be measured;
- identifying corresponding image points in at least a subset of images of the series of images, wherein the corresponding image points relate to the same feature in the surrounding as the selected image point, and identifying the corresponding image points comprises using feature recognition in at least a plurality of images of the series of images;
- determining three-dimensional coordinates of the selected image point using forward intersection with the poses of the subset of images in which corresponding image points are identified; and
- presenting the three-dimensional coordinates of the selected image point to the user.

A fourth aspect of the invention pertains to a surveying system adapted to determine positions of a position measuring resource being mounted on a surveying pole in a coordinate system of the surveying system, the surveying system comprising a surveying subsystem with a camera module and a control and evaluation unit, wherein the camera module is attached to the surveying pole and comprises at least one camera for capturing images. The control and evaluation unit is configured to control and execute an image point measurement functionality in which

- a series of images of a surrounding is captured with the at least one camera while the surveying system is moved along a path through the surrounding, the series comprising a multitude of images captured with different camera poses representing respective positions and orientations of the camera;
- at least a subset of camera poses for the images of the series are estimated; and
- at least a subset of the series of images is stored and presented to a user.

The control and evaluation unit is further configured to execute a pose quality control functionality in which the user is presented a visualization related to a quality or suitability of the captured series of images for the image point measurement.

According to one embodiment of the surveying system, the control and evaluation unit is configured to use bundle adjustment to optimize pose information by minimizing initial errors in the estimation of the camera poses, and to estimate a covariance matrix for at least a subset of the camera poses.

According to another embodiment of the surveying system, the visualization comprises a 2D map view comprising a representation of the path.

According to another embodiment of the surveying system, the visualization comprises a representation of at least a subset of the camera poses for the images of the series.

According to another embodiment of the surveying system, each camera pose of the subset is represented by a symbol indicating an orientation of the camera.

According to another embodiment of the surveying system, the control and evaluation unit is configured to calculate a quality or suitability of the camera poses for the image point measurement, wherein the user is presented a visualization related to the quality or suitability of the camera poses for the image point measurement, wherein each of the subset of camera poses is visualized with a color-coded symbol, the color representing a quality or suitability level of the camera pose.

According to another embodiment of the surveying system, the control and evaluation unit is configured to calculate an expected accuracy of the image point measurement for at least a sparse point cloud of points in the surrounding, wherein the visualization comprises a representation of the expected accuracy.

According to another embodiment of the surveying system, the representation of the expected accuracy comprises color-coded symbols, the color of each symbol representing an expected accuracy level for an image point measurement to the point of the point cloud.

According to another embodiment of the surveying system, the representation of the expected accuracy comprises isolines.

According to another embodiment of the surveying system, for estimating the camera poses the control and evaluation unit is configured

- to define at least a subset of images as frames and to define a subset of frames as key-frames,
- to identify in a first frame a plurality of textures as first features, to track the first features in frames succeeding the first frame, and to generate a first frame feature list for the first frame, wherein the first frame feature list at least comprises a position determined by the position measuring resource for the first frame, and a feature ID and image coordinates of at least one first feature,
- to identify in a second frame a plurality of textures as second features, to track the second features in frames succeeding the second frame, and to generate a second frame feature list for the second frame, wherein the second frame feature list at least comprises a position determined by the position measuring resource for the second frame, and a feature ID and image coordinates of at least one second feature, and
- to use a structure from motion algorithm to calculate camera poses based at least on the first and second frame feature lists, Upon a selection, by the user, of a key-frame and of an image point in the selected key-frame, the image point measurement functionality of the control and evaluation unit further comprises determining three-dimensional coordinates of the selected image point and presenting the three-dimensional coordinates to the user, wherein determining the three-dimensional coordinates comprises identifying corresponding image points in at least a subset of images of the series of images, wherein the corresponding image points relate to the same feature in the surrounding as the selected image point, and identifying the corresponding image points comprises using feature recognition in at least a plurality of images of the series of images, and using forward intersection with the poses of the subset of images in which corresponding image points are identified.

A fifth aspect of the invention pertains to a method for image-based point measurement, comprising moving a surveying system along a path through a surrounding, particularly a surveying system of one of the preceding claims;

capturing a series of images of the surrounding with at least one camera while moving along the path, the series comprising a multitude of images captured with different camera poses representing respective positions and orientations of the camera;

storing at least a subset of the series of images and presenting at least the subset to a user for selection of an image and of an image point in the selected image to be measured; and presenting a visualization to a user, the visualization being related to a quality or suitability of the captured series of images for the image point measurement.

According to one embodiment, the method comprises using bundle adjustment to optimize pose information by minimizing initial errors in the estimation of the camera poses; and estimating a covariance matrix for at least a subset of the camera poses.

According to another embodiment of the method, the visualization comprises a 2D map view comprising a representation of the path.

According to another embodiment of the method, the visualization comprises a representation of at least a subset of the camera poses for the images of the series.

According to another embodiment of the method, each camera pose of the subset is represented by a symbol indicating an orientation of the camera.

According to another embodiment, the method comprises calculating a quality or suitability of the camera poses for the image point measurement, and presenting a visualization to the user related to the quality or suitability of the camera poses for the image point measurement, wherein each of the subset of camera poses is visualized with a color-coded symbol, the color representing a quality or suitability level of the camera pose.

According to another embodiment, the method comprises calculating an expected accuracy of the image point measurement for at least a sparse point cloud of points in the surrounding, wherein the visualization comprises a representation of the expected accuracy.

According to another embodiment of the method, the representation of the expected accuracy comprises color-coded symbols, the color of each symbol representing an expected accuracy level for an image point measurement to the point of the point cloud.

According to another embodiment of the method, the representation of the expected accuracy comprises isolines.

According to another embodiment, the method comprises defining at least a subset of images as frames and defining a subset of frames as key-frames;

identifying in a first frame a plurality of textures as first features, tracking the first features in frames succeeding the first frame, and generating a first frame feature list for the first frame, wherein the first frame feature list at least comprises a position determined by the position measuring resource for the first frame, and a feature ID and image coordinates of at least one first feature;

identifying in a second frame a plurality of textures as second features, tracking the second features in frames succeeding the second frame, and generating a second frame feature list for the second frame, wherein the second frame feature list at least comprises a position determined by the position measuring resource for the second frame, and a feature ID and image coordinates of at least one second feature;

using a structure from motion algorithm to calculate camera poses for the images of the series based at least on the first and second frame feature lists; and storing and presenting at least the key-frames of the series of images to a user for selection of a key-frame and of an image point in the selected key-frame to be measured.

According to another embodiment, the method comprises identifying corresponding image points in at least a subset of images of the series of images, wherein the corresponding image points relate to the same feature in the surrounding as the selected image point, and identifying the corresponding image points comprises using feature recognition in at least a plurality of images of the series of images;

determining three-dimensional coordinates of the selected image point using forward intersection with the poses of the subset of images in which corresponding image points are identified; and presenting the three-dimensional coordinates of the selected image point to the user.

A sixth aspect of the invention pertains to a computer program product having program code which is stored on a machine-readable carrier, in particular on a control and evaluation unit of the surveying system according to the first aspect of the invention, for executing at least the following steps of the method according to the fifth aspect of the invention:

capturing a series of images of the surrounding with at least one camera while moving along the path, the series comprising a multitude of images captured with different camera poses representing respective positions and orientations of the camera;

storing at least a subset of the series of images and presenting at least the subset to a user for selection of an image and of an image point in the selected image to be measured; and presenting a visualization to a user, the visualization being related to a quality or suitability of the captured series of images for the image point measurement.

Figure 5:
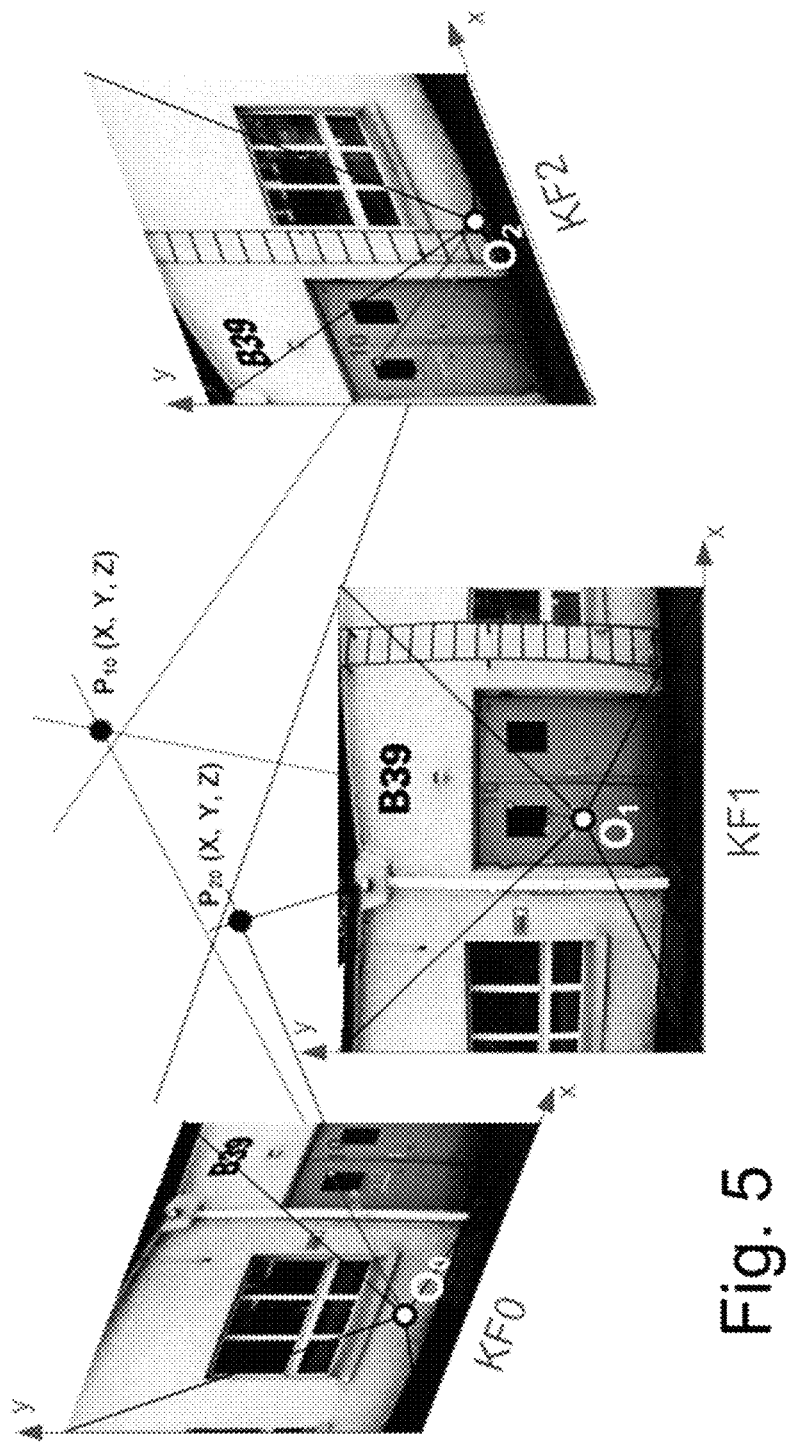
Figure 7A:
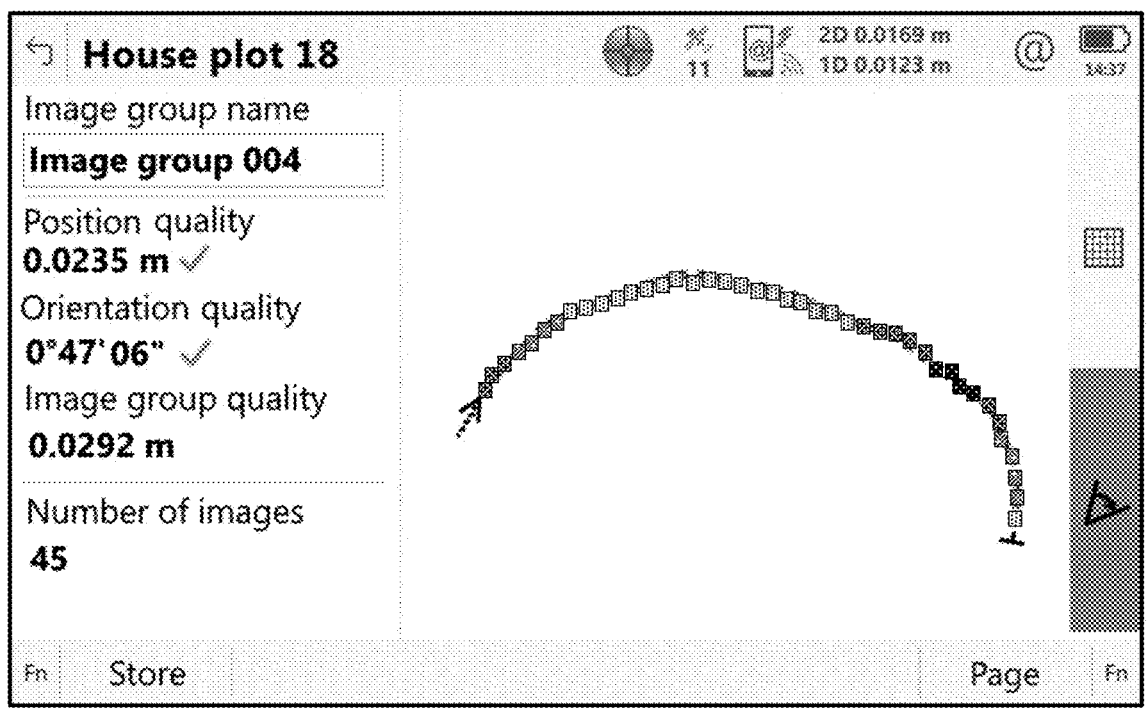
Figure 7B:
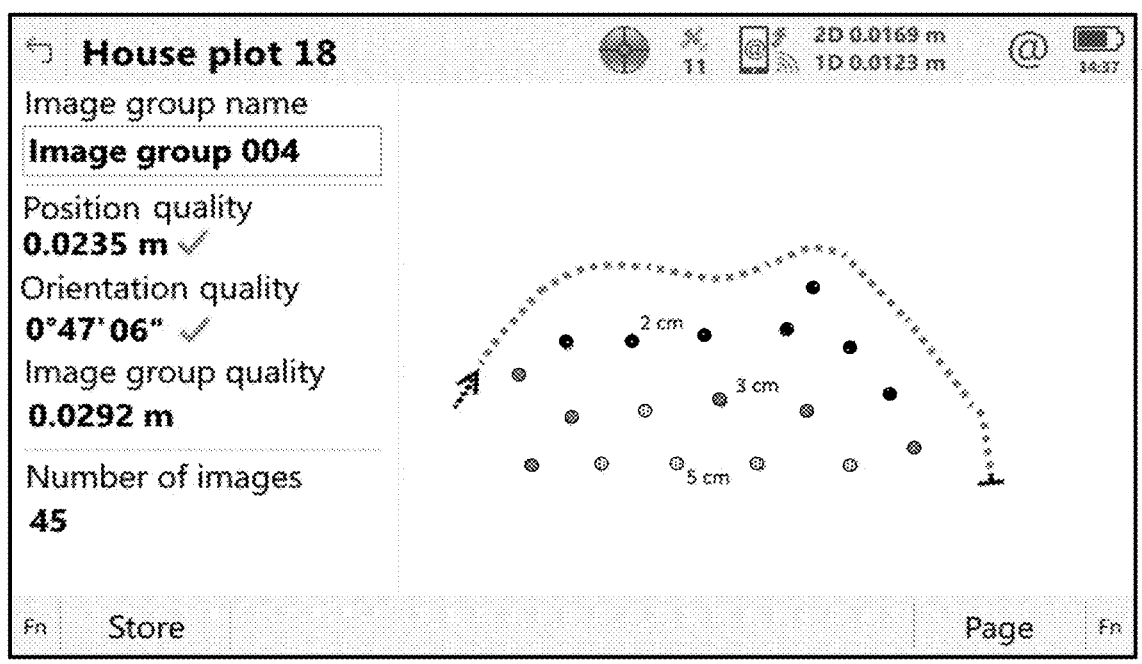
Figure 7C:
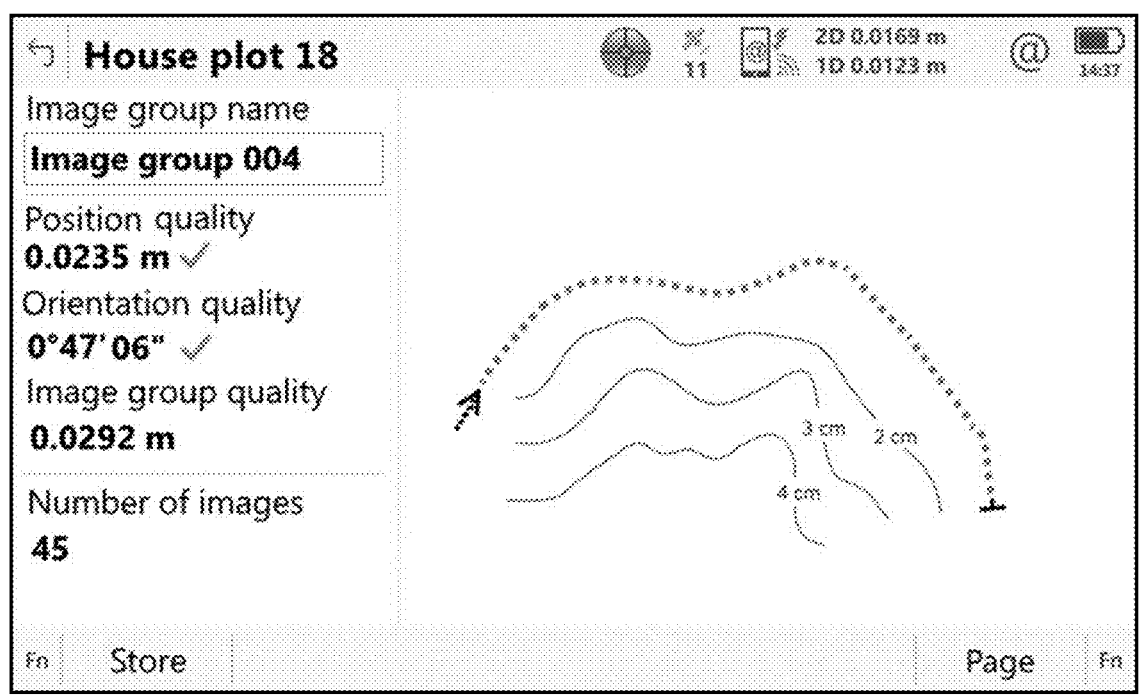

The invention in the following will be described in detail by referring to exemplary embodiments that are accompanied by figures, in which:

FIG. 1 shows an exemplary embodiment of a surveying system according to the invention;

FIGS. 2a-c show three exemplary combinations of a camera module and a position measuring resource as part of a surveying system according to the invention;

FIG. 3 illustrates capturing a series of images with the surveying system;

FIGS. 4a-b illustrate the selection of frames and key-frames;

FIG. 5 illustrates the calculation of point coordinates using a number of key-frames;

FIGS. 6a-d show a graphic user interface of an exemplary application allowing a user to select an image in which an image point should be measured;

FIGS. 7a-c show a graphic user interface of an exemplary application presenting quality information to a user comprising information about a quality of the camera poses and an expected accuracy of an image-based remote point measurement.

FIG. 1 shows an exemplary embodiment of a surveying system 1 according to the invention. The depicted surveying system 1 comprises a surveying pole 10 which is operated by a user 2. The pole 10 comprises a bottom end 11 that is positionable on a measuring point 5 on the ground. A GNSS (global navigation satellite system) antenna 15 is provided on the top end of the pole 10 as a position measuring resource of the surveying system 1. Furthermore, the surveying system 1 comprises a camera module 30 and a control and evaluation unit 12.

FIGS. 2a-c show three exemplary camera modules 30,30' that are mounted on a pole 10 together with a position measuring resource of the respective surveying system 1. Each camera module 30,30' comprises an optical recording device 31 that is sensitive to light coming from all or many spatial directions. It could be based on an imaging sensor and a fish-eye lens, or a combination of a camera and a parabolic mirror, or a minimum of two single cameras arranged on a horizontal ring, or any other optical setup functioning as a wide-angle or panorama camera.

The camera module can be a separate module 30 which is mounted on a pole 10 together with a GNSS antenna 15 (FIG. 2a) or a reflector 16 (FIG. 2b). Moreover, the module 30' can be integrated into the housing of a GNSS antenna (FIG. 2c) or reflector.

According to FIG. 2c the camera module 30' is represented by the position measuring resource which additionally comprises a GNSS antenna and/or a reflector.

The camera module 30 of FIGS. 2a and 2b has a housing and mounts for the pole 38 and for the position measuring resource (GNSS antenna or reflector). It may comprise a set of cameras 31, e. g. four single cameras aligned in angles of 90° to each other with a horizontal field-of-view >90°. In such an arrangement a horizontal field-of-view of 360° is covered. The vertical field-of-view (FOV) of the camera assembly can be about 60°. The cameras can be aligned horizontally or downward oriented, e. g. by 20°. This is advantageous for applications where close objects are of particular interest.

Moreover, a processing unit can be part of the camera module 30. The processing unit can be a CPU, e. g. an ARM processor or a combination of a CPU with an FPGA, e. g. Zync SoC, or a combination of a CPU with a graphical-processing-unit (GPU). In case of a combined processing unit, feature tracking may be carried out on the FPGA or the GPU. These are primarily image processing algorithms where a high degree of parallel processing can be achieved on units of that kind.

Also an inertial-measurement-unit (IMU) can be part of the camera module. The IMU may consist of a 3-axis accelerometer and, particularly, of a 3-axis gyroscope. Additionally, a magnetometer may be included in the IMU.

FIG. 3 illustrates the step of capturing a series of images of an exemplary embodiment of a method according to the invention. The surveying system 1 comprising a GNSS antenna is carried by a user along a trajectory. The camera module captures images at each point $t_i$, $t_{i+1}$, $t_{i+2}$ etc.

The method starts with the recording of an image bundle. The image bundle contains the object of interest, i.e. the object to be measured, from several positions. The images reflect the scene in a consecutive way to ensure a large overlap from one image to another. The image bundle acquisition can also be performed by recording a video rather than taking still images from several positions. This means the user starts the recording and needs to move along the object of interest while filming it. With the help of a live video stream, the user can orientate the surveying system to the object of interest. A record of an image bundle cannot be paused, as it is important that no image of the trajectory is missing in the data set. For each key frame a list of features will be generated, which is used for the camera pose determination.

FIGS. 4a and 4b show the resulting series of images (image bundle) as a number of frames, wherein some of the frames are key-frames (KF).

The final camera pose of each image needs to be estimated before the user can work with the image bundle. Per default the camera pose estimation starts as soon as the feature lists of at least two images are available. This process is performed in parallel with the image bundle acquisition. As the overall processing time may be longer than the recording time, the user may need to wait after he has finished the image acquisition. Therefore, optionally, the camera pose estimation can be skipped, i.e. done later, either on-site on the controller or off-site, e. g. using an office software and a desktop computer.

The Image Point Measurement gives the user the possibility to determine the global coordinates of a marked point in an image. The user needs to select the point in one image manually or by the help of a snapping tool. Only one point can be selected for the measurement. During the measurement the manually selected point is searched in all images of the image bundle along the epipolar line. Those images in which the point can be found are used to determine the global coordinates via forward intersection using the final camera poses.

If the matching algorithm cannot find the selected point in other images, the user can add the point in one or more other images manually. At least two images are needed to determine the global coordinates. If a manually added point decreases the quality of the point coordinates, the user can remove the point manually from one or more images that were used for the calculation.

The defined working range for the Image Point Measurement for instance can be 2 to 10 metres from sensor to object. Within this distance the accuracy is in the centimetre level (e. g. 2 to 3 cm). The accuracy depends on the distance between sensor and object and decreases with distance. However, the user is enabled to measure points which are more distant than 10 m. In this case, the user may need to accept an increase of the deviation up to the decimetre level.

The estimation of the camera poses from an image sequence begins with feature generation. Preferably, the feature generation starts automatically together with the image bundle acquisition and comprises two steps: feature extraction and feature tracking. Preferably, both steps can be performed on the surveying system.

The feature generation is executed on so-called key-frames. Key-frames are selected frames for which full feature extraction is performed. The second step is the tracking, which aims to find the same features (textures) of the key-frames in consecutive frames. FIG. 4a shows this on a short image sequence. During tracking, a first feature 41 can be correctly found in consecutive images. A second feature 42 cannot be found all images as it disappears in Frame 3 and the following frames. This is called a "missed match". If a different part of the image is found that looks similar to a feature, a "wrong match" can appear. For instance, the third feature 43 (appearing in frames 4 and 5, where the second feature 42 is absent) could be mistaken for the second feature 42, thus constituting a "wrong match".

In the example of FIG. 4b, the images of the captured image bundle are stored with a rate of 2 Hz. The rate of the frames used for the feature generation and tracking is 10 Hz, so that every fifth frame is defined as Key-frame (KF0, KF1). Other rates can be used, either fixed or flexible, e.g. based on a movement speed of the camera device.

The output of the feature generation is a feature list comprising a feature ID, the feature's image coordinates, the feature descriptors (eigenvalues), and the quality of the match. Additionally, each frame additionally has a position (e. g. from GNSS) and a pose (e. g. from an inertial navigation system (INS) having an IMU). The output data contains key-frames at their rate (2 Hz) and a corresponding feature list so that tracking reduces the amount of input data drastically.

The key frames and their feature list are transferred from the surveying system to the controller for further processing during the image bundle acquisition. The key-frames may be compressed (e. g. in lossy JPEG format) in order to reduce the amount of data to transfer to the controller. However, the image quality after compression must be high, in order to facilitate automatic remote point measurement. Empirically, a JPEG quality should be higher than 95%. The camera pose estimation is based on a structure from motion (SfM) algorithm and may take place on the controller or on a desktop computer. The SfM algorithm calculates an initial camera pose using feature lists of the first few frames and position and pose data, such as GNSS and INS data, and then adds all consecutive frames to compute their poses. Instead of the SfM algorithm, also a SLAM algorithm can be used.

The input for the SfM algorithm may comprise camera parameters, GNSS parameters, GNSS positions, INS data and the feature lists for each key-frames, wherein the features are connected to each other using an ID. The camera parameters may comprise a camera image size, a pixel size, a camera constant, a principal point, radial and tangential distortion parameters and extrinsic parameters. The GNSS parameters comprise a camera offset with respect to the GNSS receiver, the GNSS positions comprise a timestamp, coordinates, status and accuracy information. The INS data comprises a timestamp, an INS pose (for instance three rotation angles, a quaternion matrix or a rotation matrix) and accuracy information.

The output of the SfM algorithm is a 3D camera position (e. g. 24 bytes) and a 3×3 rotation matrix of a camera orientation (e. g. 72 bytes).

After all frames have been added to the structure, a global optimization may be started ("bundle adjustment"). During bundle adjustment, the algorithm tries to refine the 3D camera poses using the feature lists. Bundle adjustments may be necessary also during the course of adding frames to the structure. This however may increase the running time of the algorithm. In order to fulfil the accuracy requirement, accurate positions and poses are required, which helps to minimize the number of required bundle adjustments.

FIG. 5 illustrates the calculation of point coordinates using a number of key-frames (KF0, KF1, KF2). Image point measurement (IPM) is based on classical triangulation from as many images as possible (in which the measured point is visible) to reach high accuracy measurements. FIG. 5 shows an example of two image points "P10" and "P20", which are determined with three key frames.

A one-click automatic measurement may be provided as a default way to measure points in images. A user selects the point in the image manually or with the help of a snapping tool. Along the epipolar line of the selected position, the texture of the point is searched in all images of the image bundle. Those images, in which the point could be detected, are used for the triangulation to estimate the global coordinates.

Especially if the calculations need more processing power than the surveying system provides, cloud computing can be used to outsource complex calculation from the field. The data is uploaded to a cloud service, where the data is processed. After the computation has been done, the controller will be informed that the result can be downloaded.

In FIGS. 6a-d, an exemplary embodiment of the invention is described with respect to an application of the system that allows the user of the system to perform a method according to the invention. The Figures show a graphical user interface (GUI) of the application (App) that may be displayed on a display of the control and evaluation unit of the system or on a display of a hand-held device.

The App may be useable with all surveying systems having a GNSS antenna or a reflector and can be used regardless of whether an instrument is connected or not. The feature of creating an image group however is only available if surveying system having suitable sensors is connected, e.g. a GNSS mode being active.

Figure 6A:
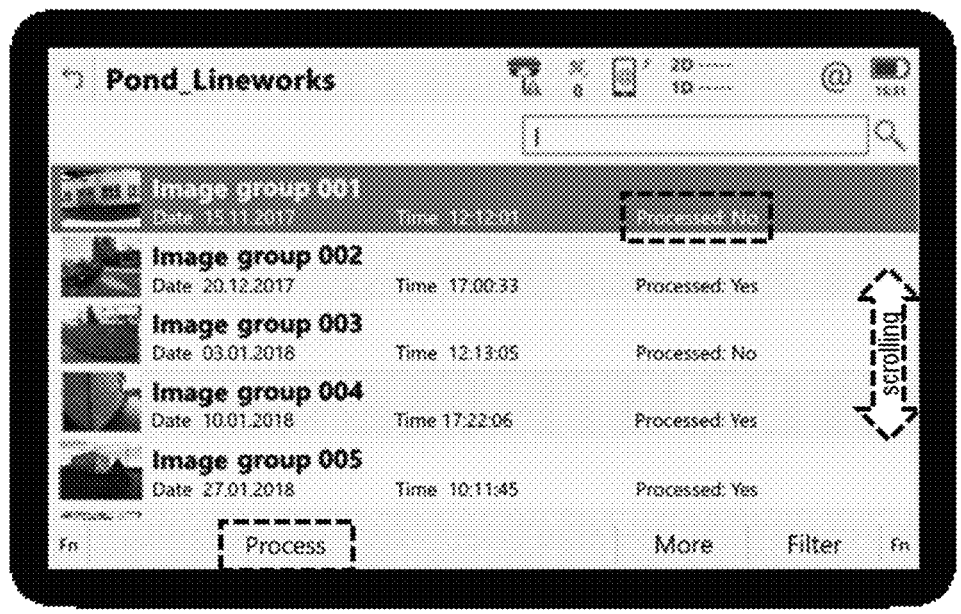

FIG. 6a shows a panel with all available image groups from an exemplary measuring job in a list. If one or more image groups exist within the job, the image groups will be listed down. If there are too many image groups within the job to show them all on one screen, a scroll option is available. If no image group exists within the job, a text like "No items to display" can be shown.

Each entry in the list starts with a thumbnail of the image group. The thumbnail is an image from the image group and can be changed by the user. The name of the image group shall be shown as the name of the list entry. The information of each group may comprise a name of the image group and a time and/or date of when it was captured.

If the menu is opened for the first time, the first image group in the list can be highlighted. Otherwise, the image group that was highlighted the last time the menu was opened will now be highlighted as well. Another image group can be highlighted by a user by clicking on another image group row. The list can be searched by typing in any character in the search bar.

When an image group is highlighted in the list, a number of options are available for this image group. Selecting the button "More" will toggle meta information, e. g. switching between the information of FIGS. 6a and 6b, i.e. information whether an image group has already been processed by SfM: ("Processed: Yes", "Processed: No"), and an information about the number of images that are part of the image group or a size of the image group (e. g. given in Megabyte).

Figure 6B:
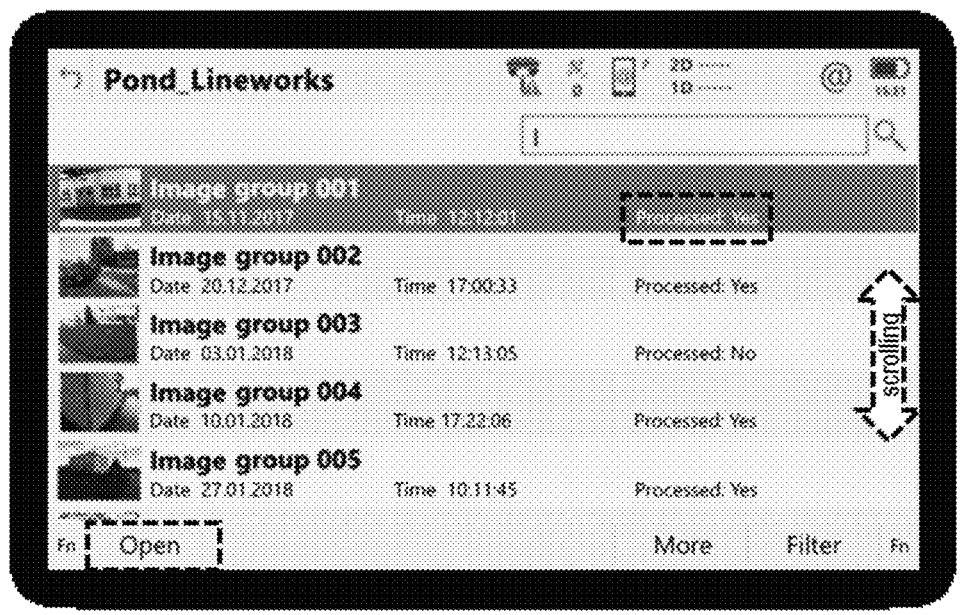

If the highlighted image group is still unprocessed as shown in FIG. 6a, the button "Process" effects processing the image group. If the highlighted image group already has been processed as shown in FIG. 6b, the button "Open" opens the image view panel as shown in FIG. 6c.

Figure 6C:
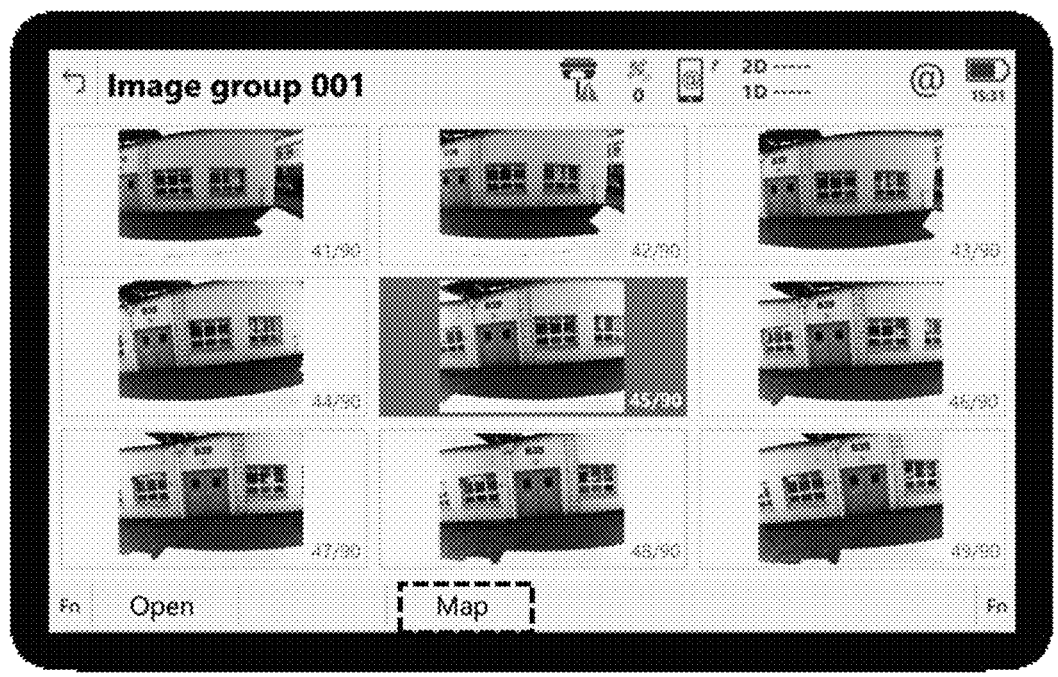

FIG. 6c shows the image view panel that is opened by the button "Open", with all the images captured within the image group being shown within a scrollable panel. The name of the current image group is shown on the top-left side of the window (here: "Image group 001"). Three images are visible within one row, three full rows being visible at the time at the screen. The images are numbered by their capturing order. Image number and the number of all the images are displayed, (e. g. "45/90"). If the image view is entered for the first time, that image which is in the middle of the image group will be highlighted. In this example, the image bundle contains 90 images, the image number 45 is highlighted. If there are 91 images, either the image number 45 or 46 can be highlighted. If the image view of the image group is not opened for the first time, advantageously that image that was highlighted the last time is highlighted.

The button "Open" opens a "Measure" view of the selected image, in which the user may select an image point for measuring.

Figure 6D:
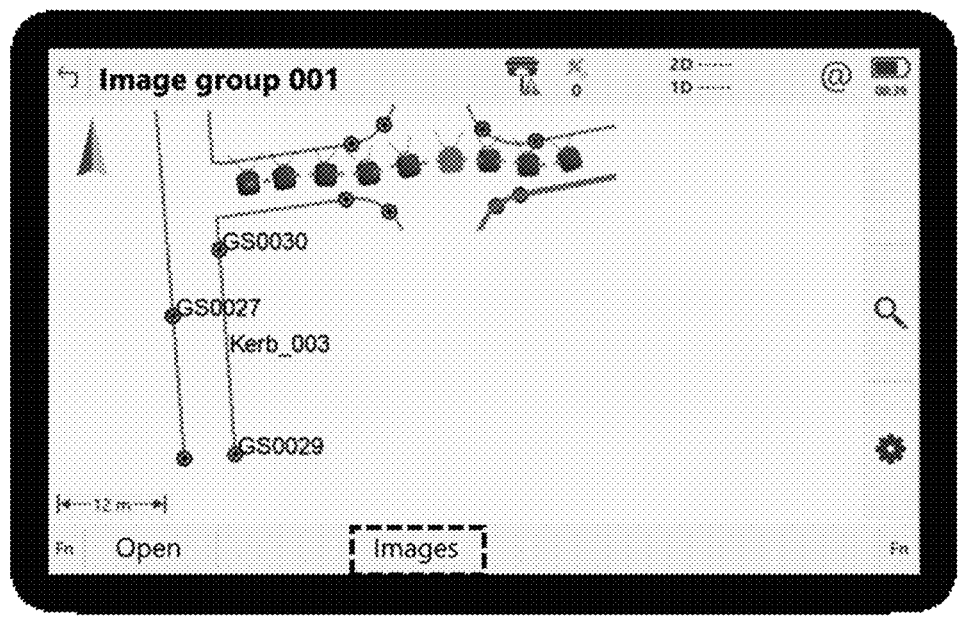

The button "Map" is visible if the measuring job has a local coordinate system. This button opens a 2D viewer, in which the trajectory can be seen. This is illustrated in FIG. 6d. If no local coordinate system is available for the selected measuring job, the 2D viewer cannot be opened.

The map view of FIG. 6d shows the trajectory of the captured images. The map view is seen from a 2D top view. The name of the current image group is shown on the top-left side of the window. Symbols on top of the trajectory indicate that the line is an image group. As the images are captured with a rate of 2 Hz, a generalization of the symbols is needed, so that the amount of visible symbols fits onto the trajectory.

The user can click near the trajectory to select the closest image next to the marked position with regard to the local coordinate position of the marker and the image. The nearby symbol can be highlighted. As soon as the user selects the button "Open", the selected image will be opened in the "Measure" view.

When entering the panel, the image that is selected in the "Image view" remains selected. This means that the nearby symbol is focused on. Other objects like CAD, scans, and points may also be shown in the map view. The button "Images" switches the view back to the Image view of FIG. 6c.

FIGS. 7a-c relate to a concept for visualizing quality information derived from the covariance matrix of the camera poses. The quality information may comprise an information about a quality of the camera poses or an expected accuracy of an image-based remote point measurement—e.g. a one-click automatic measurement—in the imaged surrounding.

The bundle adjustment optimizes the pose information (6DoF) by minimizing initial errors and estimates a covariance matrix for each camera pose. The covariance matrix (dimension 6×6) contains the quality information of the position and the orientation. Using the covariance matrices of the poses, a representative indicator can be calculated and displayed as an approximate quality of the whole recorded image group.

The information of the camera position quality and the camera orientation quality can be calculated and shown as two separate values. Advantageously, this allows determining whether there has been a problem in the calculation of the camera position or in the camera orientation during the record of an image group.

Since the quality of all camera poses is quite homogenous after the bundle adjustment, the average value of the 3D positional quality over all camera poses gives an approximate quality information of the calculated position. Like the positional quality, the average of the camera orientation quality over all camera poses gives an approximate quality information of the calculated orientation values.

The concept for visualizing quality information comprises providing a graphical display with a quality indicator that helps non-experienced users to interpret these values. Preferably, this graphical display is provided directly after the surveying system has been moved along the path through the surrounding, i.e. directly after the image capturing has been finished. This way, the user is enabled, before leaving the location, to decide based on the quality feedback whether to repeat the path or parts thereof with improved poses.

In some embodiments, the quality information can be provided in a 2D map view. Such a 2D map view gives the user the opportunity to have a look at the path and its type of trajectory that has been walked during the image group record. This helps the user to determine whether and how to amend or improve the previous path. In the examples of FIGS. 7a-c, the map view comprises a representation of a path comprising a plurality of symbols, each symbol representing one camera position along the path. Although the symbols used in FIGS. 7a-c to represent the camera poses are simple dots, also other symbols can be used. Optionally, not shown here, the camera poses may be represented by arrows or similar symbols indicating an image capturing direction of the camera. Also other information may be comprised by the symbols; for instance, the symbols may be numbered, provided with a time information, or comprise angular values related to the pose.

As illustrated in FIG. 7a, the symbols can be color-coded to display either the quality of the camera position, the quality of the camera orientation or both. For instance, green colors may represent high quality and red colors can represent low quality. In FIG. 7a, the colors are represented by different shadings, wherein dark shades represent low quality and light shades represent high quality.

The quality information can be derived from a point cloud, wherein a sparse point cloud comprising only a subset of available points normally is sufficient for deriving the quality information. The positional and orientational quality of the camera poses alone cannot properly represent the expected accuracy of the remote point measurement. The algorithm, which calculates the coordinates of the remote points adds additional errors and therefore cannot have a better quality than the camera poses of the trajectory. Hence, the quality of the trajectory can give only a trend of the expected accuracy of the remote point measurement.

A full error propagation of the remote point measurement in a grid (e.g. 1×1 m) for a certain distance range (e.g. 2 m to 10 m) is computation-intensive. To avoid the full computation, the usage of the homogenous quality of the camera poses after the bundle adjustment can be utilized. The homogenous quality of the camera poses results in a homogenous quality of the remote point measurements. The covariance matrices of a few points from the sparse point cloud that are well distributed along the trajectory are used to derive one quality indicator for the whole image group. The selection of these points must be in relation to the length of the walked trajectory, so that it can cover the whole image group. The median of the 3D positional quality over these points can be used as a representative quality indicator of the image group and shows the expected quality of a remote point measurement. The screen shots of FIGS. 7a-c show the quality indicator with the label "image group quality".

For a graphical representation of said image group quality, the 3D quality of these points can be shown in the 2D map view in different ways. Two examples are illustrated in FIGS. 7b and 7c.

In the first example of FIG. 7b, accuracy is presented by means of color-coded dots. The selected points from the sparse point cloud shall are as dots in the 2D map view. The dots can be color-coded depending on the quality derived from the covariance matrix. For instance, green colors may represent high quality and red colors can represent low quality. In FIG. 7b, the colors are represented by different shadings, wherein dark shades represent low quality and light shades represent high quality. For instance, the expected accuracy can be expressed as an average or mean deviation that is expected for a measurement at a certain remote point.

In the second example of FIG. 7c, the expected accuracy is shown by means of isolines. The selected points from the sparse point cloud can be used to calculate the expected accuracy as isolines (e.g. with values of 1 to 5 centimeters) that are visualized for the user. Each isoline forms a curve that joins points of equal value. In the shown example, the isolines join those points that have an expected deviation of 2, 3 and 4 centimeters.

The visualizations of FIGS. 7a, 7b and 7c also may be combined, e.g. to visualize remote point measurement accuracy and pose quality simultaneously or consecutively on the same screen.

Although the invention is illustrated above, partly with reference to some preferred embodiments, it must be understood that numerous modifications and combinations of different features of the embodiments can be made. For instance, the devices of the first and fourth aspect of the invention, and the methods of the second and fifth aspect may be combined with each other. All of these modifications lie within the scope of the appended claims.

The invention claimed is:

1. A surveying system adapted to determine positions of a position measuring resource being mounted on a surveying pole in a coordinate system of the surveying system, the surveying system comprising:
a surveying subsystem with a camera module and a control and evaluation unit, wherein:
the camera module is attached to the surveying pole and comprises at least one camera for capturing images,
the control and evaluation unit is configured to control and execute an image point measurement functionality in which:
a series of images of a surrounding is captured with the at least one camera while the surveying system is moved along a path through the surrounding, the series comprising a multitude of images captured with different camera poses representing respective positions and orientations of the camera;
at least a subset of camera poses for the images of the series are estimated; and
at least a subset of the series of images is stored and presented to a user, for estimating the camera poses, the control and evaluation unit is configured to:
define at least a subset of images as frames and to define a subset of frames as key-frames,
identify in a first frame a plurality of textures as first features, to track the first features in frames succeeding the first frame, and to generate a first frame feature list for the first frame, wherein the first frame feature list at least comprises a position determined by the position measuring resource for the first frame, and a feature ID and image coordinates of at least one first feature,
identify in a second frame a plurality of textures as second features, to track the second features in frames succeeding the second frame, and to generate a second frame feature list for the second frame, wherein the second frame feature list at least comprises a position determined by the position measuring resource for the second frame, and a feature ID and image coordinates of at least one second feature, and
use a structure from motion algorithm to calculate camera poses based at least on the first and second frame feature lists, and
upon a selection, by the user, of a key-frame and of an image point in the selected key-frame, the image point measurement functionality of the control and evaluation unit further comprises determining three-dimensional coordinates of the selected image point and presenting the three-dimensional coordinates to the user, wherein determining the three-dimensional coordinates comprises:
identifying corresponding image points in at least a subset of images of the series of images, wherein the corresponding image points relate to the same feature in the surrounding as the selected image point, and identifying the corresponding image points comprises using feature recognition in at least a plurality of images of the series of images, and
using forward intersection with the poses of the subset of images in which corresponding image points are identified.

2. The surveying system according to claim 1, wherein:
the surveying subsystem comprises an inertial measurement unit comprising at least one of a three-axis accelerometer, a three-axis gyroscope and a magnetometer, and
the key-frame feature lists comprise data from the inertial measurement unit for the respective key-frame.

3. The surveying system according to claim 1, comprising sensors for determining a movement speed of the camera, wherein:
frames are defined as a subset of images that are captured with a rate that depends on an actual determined movement speed; and/or
key-frames are defined as a subset of frames or images that are captured with a rate that depends on an actual determined movement speed.

4. The surveying system according to claim 1, comprising a display device, wherein:
the camera poses of the key-frames are presented to the user on the display device, particularly by means of a symbol in a two-dimensional map of the surrounding, the symbol being positioned and oriented according to the camera pose, and
a key-frame is selectable by the user by selection of a camera pose.

5. The surveying system according to claim 1, wherein:
the structure from motion algorithm is configured to calculate camera poses based at least on the first and second key-frame feature lists and further based on at least one of camera parameters, position measuring resource parameters, position measuring resource positions and Inertial Navigation System data, wherein:

the camera parameters comprise a camera image size, a pixel size, a camera constant, a principal point, radial and tangential distortion parameters and extrinsic parameters, the position measuring resource parameters comprise a camera offset with respect to the position measuring resource, the position measuring resource positions comprise a timestamp, coordinates, status and accuracy information, and the Inertial Navigation System data comprises a timestamp, an Inertial Navigation System pose, particularly comprising three rotation angles or a rotation matrix determined by an inertial measurement unit of the camera module, and accuracy information.

6. The surveying system according to claim 1, wherein the position measuring resource comprises at least one of a Global Navigation Satellite System antenna and a retroreflector.

7. A method for image-based point measurement, comprising:

moving a surveying system along a path through a surrounding, particularly a surveying system of one of the preceding claims;

capturing a series of images of the surrounding with at least one camera while moving along the path, the series comprising a multitude of images captured with different camera poses representing respective positions and orientations of the camera;

defining at least a subset of images as frames and defining a subset of frames as key-frames;

identifying in a first frame a plurality of textures as first features, tracking the first features in frames succeeding the first frame, and generating a first frame feature list for the first frame, wherein the first frame feature list at least comprises a position determined by the position measuring resource for the first frame, and a feature ID and image coordinates of at least one first feature;

identifying in a second frame a plurality of textures as second features, tracking the second features in frames succeeding the second frame, and generating a second frame feature list for the second frame, wherein the second frame feature list at least comprises a position determined by the position measuring resource for the second frame, and a feature ID and image coordinates of at least one second feature;

using a structure from motion algorithm to calculate camera poses for the images of the series based at least on the first and second frame feature lists;

storing and presenting at least the key-frames of the series of images to a user for selection of a key-frame and of an image point in the selected key-frame to be measured;

identifying corresponding image points in at least a subset of images of the series of images, wherein the corresponding image points relate to the same feature in the surrounding as the selected image point, and identifying the corresponding image points comprises using feature recognition in at least a plurality of images of the series of images;

determining three-dimensional coordinates of the selected image point using forward intersection with the poses of the subset of images in which corresponding image points are identified; and presenting the three-dimensional coordinates of the selected image point to the user.

8. The method according to claim 7, wherein the first frame is a first key frame and the first frame feature list is a first key-frame feature list.

9. The method according to claim 7, wherein the frame feature lists comprise data from an inertial measurement unit for the respective frame.

10. The method according to claim 7, wherein using feature recognition comprises searching for a feature along an epipolar line in the plurality of images.

11. The method according to claim 7, comprising determining a movement speed of the camera, wherein:

frames are defined as a subset of images that are captured with a rate that depends on an actual determined movement speed; and/or key-frames are defined as a subset of frames or images that are captured with a rate that depends on an actual determined movement speed.

12. The method according to claim 7, further comprising presenting the camera poses of the key-frames to the user by displaying a symbol in a two-dimensional map of the surrounding, the symbol being positioned and oriented according to the camera pose, wherein a key-frame is selectable by the user by selection of a camera pose.

13. The method according to claim 7, wherein:

the camera poses are calculated based at least on the first and second frame feature lists and further based on at least one of camera parameters, position measuring resource parameters, position measuring resource positions and Inertial Navigation System data, wherein:

the camera parameters comprise a camera image size, a pixel size, a camera constant, a principal point, radial and tangential distortion parameters and extrinsic parameters, the position measuring resource parameters comprise a camera offset with respect to a position measuring resource of the surveying system, the position measuring resource positions comprise a timestamp, coordinates, status and accuracy information, and the Inertial Navigation System data comprises a timestamp, an Inertial Navigation System pose, particularly comprising three rotation angles or a rotation matrix determined by an inertial measurement unit of the surveying system, and accuracy information.

14. A computer program product having program code which is stored on a machine-readable carrier for executing the method of claim 7.

15. A surveying system adapted to determine positions of a position measuring resource being mounted on a surveying pole in a coordinate system of the surveying system, the surveying system comprising:

a surveying subsystem with a camera module and a control and evaluation unit, wherein the camera module is attached to the surveying pole and comprises at least one camera for capturing images and the control and evaluation unit is configured to control and execute an image point measurement functionality in which:

a series of images of a surrounding is captured with the at least one camera while the surveying system is moved along a path through the surrounding, the series comprising a multitude of images captured with different camera poses representing respective positions and orientations of the camera;

at least a subset of camera poses for the images of the series are estimated; and at least a subset of the series of images is stored and presented to a user on a display device, wherein the control and evaluation unit is configured to execute a pose quality control functionality in which the user is presented, on the display device, a visualization related to a quality or suitability of the captured series of images for the image point measurement, wherein:

for estimating the camera poses the control and evaluation unit is configured to:

define at least a subset of images as frames and to define a subset of frames as key-frames, identify in a first frame a plurality of textures as first features, to track the first features in frames succeeding the first frame, and to generate a first frame feature list for the first frame, wherein the first frame feature list at least comprises a position determined by the position measuring resource for the first frame, and a feature ID and image coordinates of at least one first feature, identify in a second frame a plurality of textures as second features, to track the second features in frames succeeding the second frame, and to generate a second frame feature list for the second frame, wherein the second frame feature list at least comprises a position determined by the position measuring resource for the second frame, and a feature ID and image coordinates of at least one second feature, and use a structure from motion algorithm to calculate camera poses based at least on the first and second frame feature lists, upon a selection, by the user, of a key-frame and of an image point in the selected key-frame, the image point measurement functionality of the control and evaluation unit further comprises determining three-dimensional coordinates of the selected image point and presenting the three-dimensional coordinates to the user, wherein determining the three-dimensional coordinates comprises:

identifying corresponding image points in at least a subset of images of the series of images, wherein the corresponding image points relate to the same feature in the surrounding as the selected image point, and identifying the corresponding image points comprises using feature recognition in at least a plurality of images of the series of images, and using forward intersection with the poses of the subset of images in which corresponding image points are identified.

16. The surveying system according to claim 15, wherein the control and evaluation unit is configured to:

use bundle adjustment to optimize pose information by minimizing initial errors in the estimation of the camera poses; and estimate a covariance matrix for at least a subset of the camera poses.

17. The surveying system according to claim 15, wherein the visualization comprises a 2D map view comprising a representation of the path and a representation of at least a subset of the camera poses for the images of the series, the representation comprising a symbol indicating an orientation of the camera.

18. The surveying system according to claim 15, wherein:

the control and evaluation unit is configured to calculate a quality or suitability of the camera poses for the image point measurement, and the user is presented a visualization related to the quality or suitability of the camera poses for the image point measurement, wherein each of the subset of camera poses is visualized with a color-coded symbol, the color representing a quality or suitability level of the camera pose.

19. The surveying system according to claim 15, wherein:

the control and evaluation unit is configured to calculate an expected accuracy of the image point measurement for at least a sparse point cloud of points in the surrounding, and the visualization comprises a representation of the expected accuracy, the representation comprising at least one of isolines and color-coded symbols, the color of each symbol representing an expected accuracy level for an image point measurement to the point of the point cloud.

20. A method for image-based point measurement, comprising:

moving a surveying system along a path through a surrounding;

capturing a series of images of the surrounding with at least one camera while moving along the path, the series comprising a multitude of images captured with different camera poses representing respective positions and orientations of the camera;

storing at least a subset of the series of images and presenting at least the subset to a user for selection of an image and of an image point in the selected image to be measured;

defining at least a subset of images as frames and defining a subset of frames as key-frames;

identifying in a first frame a plurality of textures as first features, tracking the first features in frames succeeding the first frame, and generating a first frame feature list for the first frame, wherein the first frame feature list at least comprises a position determined by the position measuring resource for the first frame, and a feature ID and image coordinates of at least one first feature;

identifying in a second frame a plurality of textures as second features, tracking the second features in frames succeeding the second frame, and generating a second frame feature list for the second frame, wherein the second frame feature list at least comprises a position determined by the position measuring resource for the second frame, and a feature ID and image coordinates of at least one second feature;

using a structure from motion algorithm to calculate camera poses for the images of the series based at least on the first and second frame feature lists; and storing and presenting at least the key-frames of the series of images to a user for selection of a key-frame and of an image point in the selected key-frame to be measured; and presenting a visualization to a user, the visualization being related to a quality or suitability of the captured series of images for the image point measurement.

21. The method according to claim 20, comprising:

using bundle adjustment to optimize pose information by minimizing initial errors in the estimation of the camera poses; and estimating a covariance matrix for at least a subset of the camera poses.

22. The method according to claim 20, wherein:

the visualization comprises a 2D map view comprising a representation of the path and a representation of at least a subset of the camera poses for the images of the series, and each camera pose of the subset is represented by a symbol indicating an orientation of the camera.

23. The method according to claim 20, comprising:

calculating a quality or suitability of the camera poses for the image point measurement, and presenting a visualization to the user related to the quality or suitability of the camera poses for the image point measurement, wherein each of the subset of camera poses is visualized with a color-coded symbol, the color representing a quality or suitability level of the camera pose.

24. The method according to claim 20, further comprising:

calculating an expected accuracy of the image point measurement for at least a sparse point cloud of points in the surrounding, wherein:

the visualization includes a representation of the expected accuracy, and the representation of the expected accuracy includes at least one of isolines and color-coded symbols, the color of each symbol representing an expected accuracy level for an image point measurement to the point of the point cloud.

25. The method according to claim 20, further comprising:

identifying corresponding image points in at least a subset of images of the series of images, wherein the corresponding image points relate to the same feature in the surrounding as the selected image point, and identifying the corresponding image points comprises using feature recognition in at least a plurality of images of the series of images;

determining three-dimensional coordinates of the selected image point using forward intersection with the poses of the subset of images in which corresponding image points are identified; and presenting the three-dimensional coordinates of the selected image point to the user.

26. A computer program product having program code which is stored on a machine-readable carrier for executing the method of claim 20.

* * * * *